(12) United States Patent
Nagai et al.

(10) Patent No.: US 9,822,791 B2
(45) Date of Patent: Nov. 21, 2017

(54) SEAL DEVICE AND ROTARY MACHINE

(71) Applicants: MITSUBISHI HEAVY INDUSTRIES, LTD., Tokyo (JP); MITSUBISHI HEAVY INDUSTRIES COMPRESSOR CORPORATION, Tokyo (JP)

(72) Inventors: Naoyuki Nagai, Tokyo (JP); Satoshi Saburi, Tokyo (JP); Takashi Sato, Tokyo (JP); Daisuke Kiuchi, Hiroshima (JP); Shinichiro Tokuyama, Hiroshima (JP)

(73) Assignees: MITSUBISHI HEAVY INDUSTRIES, LTD., Tokyo (JP); MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 296 days.

(21) Appl. No.: 14/435,813

(22) PCT Filed: Aug. 29, 2013

(86) PCT No.: PCT/JP2013/073209
§ 371 (c)(1),
(2) Date: Apr. 15, 2015

(87) PCT Pub. No.: WO2014/087708
PCT Pub. Date: Jun. 12, 2014

(65) Prior Publication Data
US 2015/0267710 A1 Sep. 24, 2015

(30) Foreign Application Priority Data

Dec. 4, 2012 (JP) .................................. 2012-265641

(51) Int. Cl.
*F04D 29/10* (2006.01)
*F04D 29/057* (2006.01)
(Continued)

(52) U.S. Cl.
CPC ......... *F04D 29/102* (2013.01); *F04D 17/122* (2013.01); *F04D 29/056* (2013.01);
(Continued)

(58) Field of Classification Search
CPC .... F04D 29/102; F04D 29/056; F04D 17/122; F04D 29/122; F04D 29/057; F04D 29/10;
(Continued)

(56) References Cited

U.S. PATENT DOCUMENTS 3,131,940 A * 5/1964 Ertaud .................... F04D 29/10
277/425
3,411,794 A * 11/1968 Allen .................... F01D 11/001
277/414

(Continued)

FOREIGN PATENT DOCUMENTS

JP 49-43666 B1 11/1974
JP 62-44145 B2 9/1987
(Continued)

OTHER PUBLICATIONS

International Search Report, issued in PCT/JP2013/073209, dated Dec. 3, 2013.
(Continued)

Primary Examiner — Gregory Anderson
Assistant Examiner — Eldon Brockman
(74) Attorney, Agent, or Firm — Birch, Stewart, Kolasch & Birch, LLP

(57) ABSTRACT

Provided is a seal device configured to prevent leakage of a fluid on an outer circumferential surface of a rotary shaft in a direction along an axis of the rotary shaft. The seal device includes an annular main body section disposed in a circumferential direction of the rotary shaft, and a plurality of
(Continued)

at least two kinds of holes formed in an inner circumferential surface of the main body section opening and facing to the outer circumferential surface of the rotary shaft, and having different depths.

20 Claims, 6 Drawing Sheets

(51) Int. Cl.
*F16J 15/44* (2006.01)
*F04D 17/12* (2006.01)
*F04D 29/12* (2006.01)
*F04D 29/056* (2006.01)

(52) U.S. Cl.
CPC ......... *F04D 29/057* (2013.01); *F04D 29/122* (2013.01); *F16J 15/444* (2013.01); *F05D 2300/612* (2013.01)

(58) Field of Classification Search
CPC ...... F04D 29/12; F04D 29/124; F04D 29/668; F04D 29/162; F04D 29/126; F16J 15/444; F16J 15/441; F16J 15/44; F16J 15/447; F16J 15/4472; F05D 2300/612; F01D 11/005; F01D 11/003
See application file for complete search history.

(56) References Cited

U.S. PATENT DOCUMENTS

| | | | | |
|---|---|---|---|---|
| 3,518,020 | A * | 6/1970 | Lake | F04D 29/102 277/422 |
| 4,416,457 | A | 11/1983 | McGinnis et al. | |
| 4,545,586 | A * | 10/1985 | von Pragenau | F16J 15/444 277/414 |
| 4,927,326 | A * | 5/1990 | von Pragenau | F01D 11/025 415/170.1 |
| 5,161,942 | A * | 11/1992 | Chen | F01D 11/127 277/414 |
| 2006/0267289 | A1* | 11/2006 | Li | F04D 29/102 277/347 |
| 2007/0069477 | A1* | 3/2007 | Li | F04D 29/102 277/415 |
| 2007/0257444 | A1* | 11/2007 | Childs | F16J 15/444 277/412 |
| 2010/0034646 | A1* | 2/2010 | Magara | F16J 15/4472 415/173.5 |
| 2010/0166544 | A1* | 7/2010 | Yamaguchi | F01D 11/001 415/174.5 |

FOREIGN PATENT DOCUMENTS

| | | |
|---|---|---|
| JP | 2-2441 B2 | 1/1990 |
| JP | 3-17477 U | 2/1991 |
| JP | 11-44201 A | 2/1999 |
| JP | 2010-38114 A | 2/2010 |

OTHER PUBLICATIONS

Written Opinion of the International Searching Authority, issued in PCT/JP2013/073209, dated Dec. 3, 2013.

* cited by examiner

SEAL DEVICE AND ROTARY MACHINE

TECHNICAL FIELD

The present invention relates to a seal device, and a rotary machine including the same.

Priority is claimed on Japanese Patent Application No. 2012-265641, filed Dec. 4, 2012, the content of which is incorporated herein by reference.

BACKGROUND ART

A centrifugal compressor configured to compress a gas is widely known as a rotary machine. In such a centrifugal compressor, an impeller is installed in a casing, and a gas suctioned from a suction port is compressed by rotation of the impeller and ejected from an ejection port.

Here, an impeller eye seal is installed in a impeller eye, an intermediate stage seal is installed between stages of the impellers, and a balance piston section seal is installed at the last stage to reduce a leakage amount of the gas compressed by the impeller. Then, various seals such as a damper seal, a labyrinth seal, and so on, may be used as the seal.

The labyrinth seal has a plurality of protrusions protruding from an annular standstill side member opposite to a rotating rotary shaft with a gap interposed therebetween toward the rotary shaft. In the labyrinth seal, leakage of a fluid can be reduced by generating a pressure loss in the fluid flowing through the vicinity of a tip of the protrusion. A honeycomb seal, a hole pattern seal, or the like, is known as the damper seal. For example, in the hole pattern seal, in the annular standstill side member having the gap with the rotary shaft, a plurality of hole sections are formed at an opposite surface thereof opposite to the rotary shaft. The leakage of the fluid is reduced by the pressure loss generated in the hole section.

The hole pattern seal has a larger damping effect of vibrations than the labyrinth seal, and is excellent in stabilization of vibrations of the rotary shaft. Meanwhile, the labyrinth seal can further reduce the leakage amount of the fluid in comparison with the damper seal.

A seal structure using the hole pattern seal is disclosed in Patent Literature 1. In the seal structure of Patent Literature 1, as both of the labyrinth seal and the hole pattern seal are used, various advantages are utilized to improve rotation performance of the centrifugal compressor while improving seal performance.

The rotary shaft of the rotary machine is supported by a bearing. Then, when a destabilization force generated from the seal or the impeller with respect to the damping force obtained by the bearing is increased, unstable vibrations occur with a natural frequency of the rotary machine determined by a load or a revolution number. As a result, the rotary shaft is vibrated. In consideration of the above-mentioned problems, anisotropy of the stiffness (anisotropic stiffness) of the bearing is provided by the stiffness of the bearing being varied in the circumferential direction. Then, a method of intentionally vibrating the rotary shaft in an oval shape and suppressing unstable vibrations of the rotary shaft is employed.

CITATION LIST

Patent Literature

[Patent Literature 1] Japanese Patent Application, First Publication No. 2010-38114

SUMMARY OF INVENTION

Technical Problem

However, in general, the hole pattern seal has uniform stiffness in the circumferential direction (has isotropic stiffness). While a cross-sectional shape and a disposition interval of the holes in the hole pattern seal disclosed in Patent Literature 1 are also described, there is no description that the hole pattern seal of Patent Literature 1 basically has anisotropic stiffness. Accordingly, when such a hole pattern seal is applied to the rotary shaft vibrated in the oval shape as described above, the isotropic stiffness of the hole pattern seal is applied to weaken the anisotropic stiffness of the bearing. Accordingly, oval centrifugal whirling of the rotary shaft approaches centrifugal whirling in a perfect circle, and unstable vibrations of the rotary shaft may not be suppressed.

The present invention provides a seal device and a rotary machine that are capable of obtaining a seal effect while suppressing unstable vibrations of a rotary shaft.

Solution to Problem

According to a first aspect of the present invention, there is provided a seal device configured to prevent leakage of a fluid on an outer circumferential surface of a rotary shaft in a direction along an axis of the rotary shaft, the seal device including an annular main body section disposed on the outer circumferential surface of the rotary shaft in the circumferential direction of the axis, wherein a plurality of at least two kinds of holes having different depths are formed in the inner circumferential surface of the main body section and are opening and facing to the outer circumferential surface of the rotary shaft.

According to the seal device, the holes having different depths are formed in the inner circumferential surface of the main body section. When the depths of the holes are different, a natural frequency of an air core varies. For this reason, a damping force can be applied to unstable vibrations of at least two or more kinds of various frequencies in the rotary shaft.

In the seal device according to a second aspect of the present invention, the main body section according to the first aspect may has different stiffness that varies in at least two radial directions of the axis that differ by 90 degrees.

The seal device having stiffness of the main body section that varies in the circumferential direction has anisotropic stiffness in the circumferential direction, and does not weaken the centrifugal whirling even when applied to the rotary shaft oscillated in an oval shape. Accordingly, unstable vibrations of the rotary shaft can be suppressed.

In the seal device according to a third aspect of the present invention, the main body section according to the second aspect may be formed such that a depth of the hole in one of the two radial directions is larger than that of the hole in the other of the two radial direction.

As the holes are formed in this way, the damping force can be applied to the various frequencies of unstable vibrations. Further, a pressure loss generated in a fluid in each hole becomes irregular in the circumferential direction, and depths of the holes vary in the circumferential direction. That is, since the thickness of the main body section varies in the circumferential direction, the seal device has anisotropic stiffness in the circumferential direction. Accordingly, the unstable vibrations of the rotary shaft can be more securely suppressed.

In the seal device according to a fourth aspect of the present invention, the plurality of holes according to the third aspect may be formed in one direction perpendicular to the axis.

Since the holes can be machined in one direction, i.e., toward one side, when the plurality of holes are formed, the machining can be facilitated.

In the seal device according to a fifth aspect of the present invention, terminations of the plurality of holes according to the fourth aspect may be almost equally distant from the axis in the circumferential direction.

In a state in which the plurality of holes are formed in the one direction, the distances from the axis to the terminations of the holes (shortest distances from the axis to the terminations) are almost equal in the circumferential direction. For this reason, the terminations of all of the holes are disposed at substantially the same positions of the main body section in the radial direction. Accordingly, the depths of the holes are different in the circumferential direction, and the unstable vibrations of the rotary shaft can be suppressed.

In the seal device according to a sixth aspect of the present invention, the main body section according to any one of the first to fourth aspects may be formed to be divisible in the one direction.

As the main body section has a divided structure, die cutting becomes easy. Accordingly, for example, the main body section in which the holes are previously formed by casting or forging can be manufactured, and the machining can be facilitated.

In the seal device according to a seventh aspect of the present invention, the main body section according to the first aspect may be formed of a porous body, and pores of the porous body may be the holes.

The holes have random shapes in the circumferential direction due to the main body section formed of the porous body. For this reason, similarly, the plurality of holes having different diameters and depths are formed, and thus a seal effect can be obtained while suppressing the unstable vibrations of the rotary shaft. Further, since there is no need to separately machine the holes, fewer machining processes can be performed.

In the seal device according to an eighth aspect of the present invention, the main body section according to the seventh aspect may have different stiffness that varies in at least two of the radial directions of the axis by 90 degrees.

The seal device has anisotropic stiffness in the circumferential direction, the oval centrifugal whirling of the rotary shaft is not weakened, and the unstable vibrations can be suppressed.

In the seal device according to a ninth aspect of the present invention, the main body section according to any one of the first to eighth aspects may have different thickness that varies in the circumferential direction.

As the thickness of the main body section varies, the diameters or depths of the plurality of holes vary to each other more reliably in the circumferential direction, and the seal device has anisotropic stiffness in the circumferential direction. Accordingly, unstable vibrations of the rotary shaft can be suppressed.

A rotary machine according to a tenth aspect of the present invention includes a rotary shaft; a pair of bearings configured to support the rotary shaft at both ends and having different stiffness that varies in a circumferential direction of the rotary shaft; and the seal device according to any one of the first to ninth aspect disposed between the pair of bearings.

According to the rotary machine, since the plurality of holes having different depths are formed in the main body section of the seal device, the damping force can be applied to unstable vibrations of various frequencies in the rotary shaft.

Advantageous Effects of Invention

According to the seal device and the rotary machine, as depths of the plurality of holes opposite to the outer circumferential surface of the rotary shaft vary, the seal effect can be obtained while suppressing unstable vibrations of the rotary shaft.

DESCRIPTION OF EMBODIMENTS

[First Embodiment]

Hereinafter, a rotary machine 1 according to a first embodiment of the present invention will be described.

Figure 1:
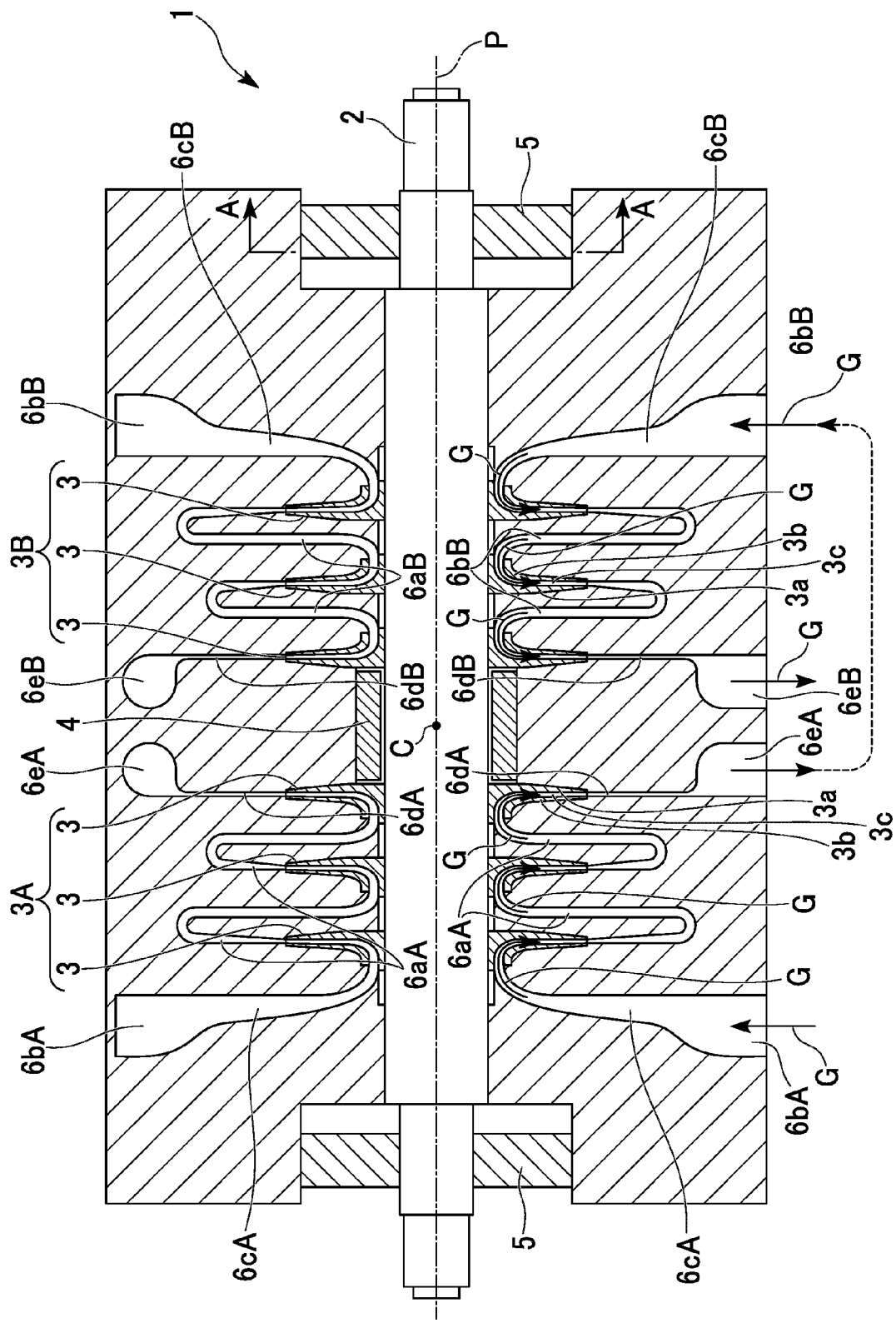
FIG. 1 is a general side view showing a rotary machine according to a first embodiment of the present invention.

As shown in FIG. 1, the rotary machine 1 of the embodiment is a multistage centrifugal compressor including a plurality of impellers 3.

The rotary machine 1 includes a rotary shaft 2 disposed about an axis P, a bearing 5 configured to rotatably support the rotary shaft 2 about the axis P, the impellers 3 attached to the rotary shaft 2 and configured to compress a process gas (fluid) G using the centrifugal force, a seal device 4 disposed between the impellers 3 and installed along an outer circumferential surface of the rotary shaft 2, and a casing 6 configured to cover the components from an outer circumferential side.

The rotary shaft 2 extends in a direction of the axis P to form a columnar shape, and is rotatably supported at both ends in the direction of the axis P by the bearing 5.

The impeller 3 is disposed between the bearings 5 installed at both ends in the direction of the axis P of the rotary shaft 2. The impellers 3 constitute two sets of three-stage impeller groups 3A and 3B in which directions of blades are opposite to each other in the direction of the axis P of the rotary shaft 2. The three-stage impeller group 3A and the three-stage impeller group 3B are attached to the rotary shaft 2 in a state in which rear surface sides thereof are directed toward a central position C in the direction of the axis P of the rotary shaft 2. The three-stage impeller group 3A is disposed at one side of the rotary shaft 2 in the axis P direction (a left side of FIG. 1), and the three-stage impeller group 3B is disposed at the other side of the rotary shaft 2 in the axis P direction (a right side of FIG. 1).

The impeller 3 includes a substantially circular plate-shaped disk 3*a* having a diameter that gradually increases outward in a radial direction of the axis P toward the central position C in the direction of the axis P of the rotary shaft 2, a plurality of blades 3*c* radially installed at the disk 3*a* in the circumferential direction of the axis P at intervals, and a cover 3*b* installed opposite the disk 3*a* and configured to cover the plurality of blades 3*c*.

Then, the process gas G flows through the three-stage impeller group 3A and the three-stage impeller group 3B toward the central position C in the direction of the axis P and is compressed.

The bearings 5 are installed at both end sections of the rotary shaft 2. The bearings 5 rotatably support the rotary shaft 2.

Figure 2:
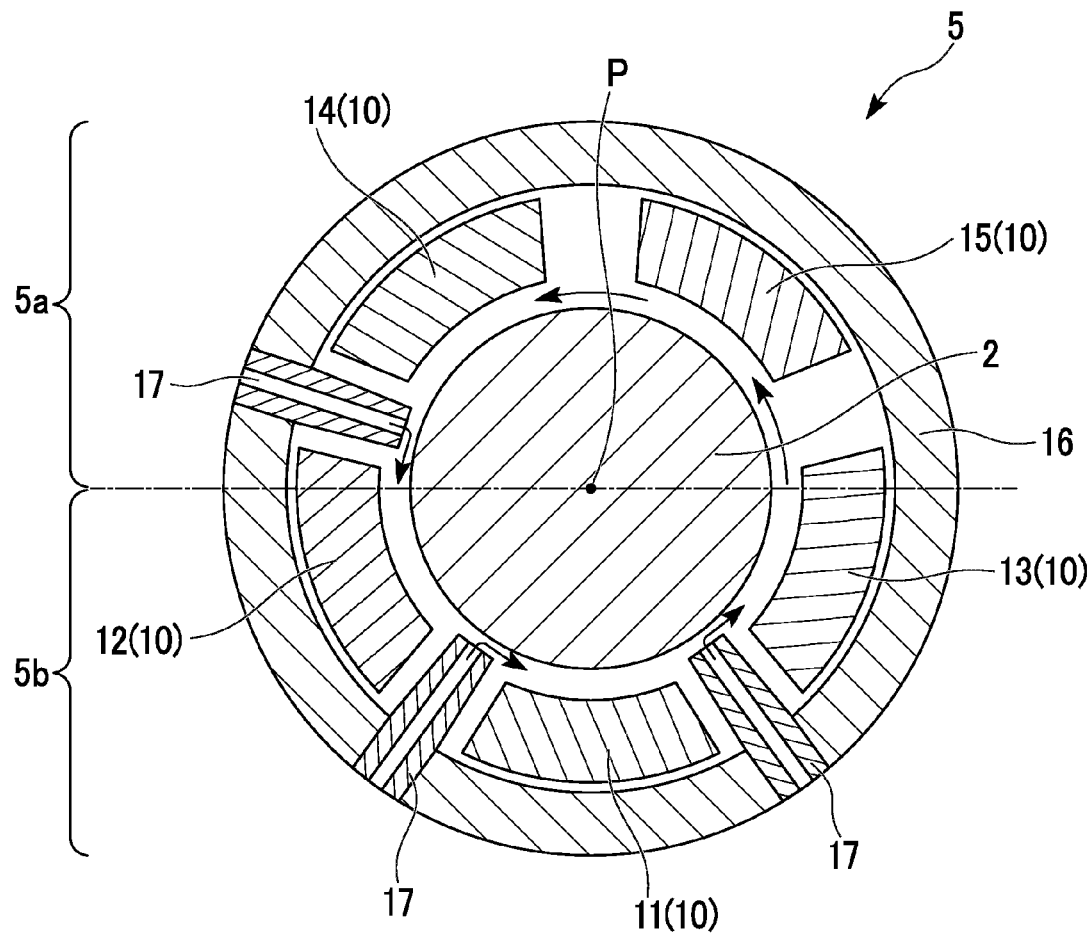
FIG. 2 is a view schematically showing a bearing of the rotary machine according to the first embodiment of the present invention, showing a cross-sectional view taken along line A-A of FIG. 1.
Figure 2:
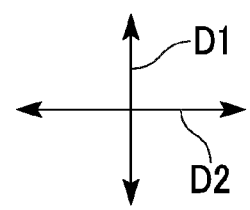

As shown in FIG. 2, each of the bearings 5 has a plurality of bearing pads 10 installed to be opposite to the outer circumferential surface of the rotary shaft 2, a bearing casing 16 configured to support the bearing pads 10 from the outer circumferential sides thereof, and a lubricant supply unit 17 disposed between the plurality of bearing pads 10.

The bearing pads 10 are installed in the circumferential direction at intervals, and are slidable between the outer circumferential surface of the rotary shaft 2. Among the bearing pads 10 of the embodiment, a first bearing pad 11 is disposed directly under the rotary shaft 2. In addition, a second bearing pad 12 and a third bearing pad 13 are disposed at equal intervals from the first bearing pad 11 in the circumferential direction by an interval of 72 degrees. Further, a fourth bearing pad 14 is disposed to be spaced an interval of 72 degrees from the second bearing pad 12 in the circumferential direction, and a fifth bearing pad 15 is disposed to be spaced an interval of 72 degrees from the third bearing pad 13 in the circumferential direction. In this way, the bearing pad 10 is constituted by five pads which support the rotary shaft 2.

As the bearing pads 10 are disposed in this way, while the three bearing pads 10 support the rotary shaft 2 at a lower half section 5*b* of the bearing 5, the two bearing pads 10 support the rotary shaft 2 at an upper half section 5*a*. That is, the stiffness of the bearing 5 is not uniform in the circumferential direction, i.e., has so-called anisotropic stiffness. For this reason, the bearing pads 10 support the rotary shaft 2 such that the rotary shaft 2 is oscillated in an oval shape along with rotation of the rotary shaft 2.

In the embodiment, according to disposition of the above-mentioned bearing pads 10, the bearing 5 has strong stiffness in a vertical direction D1, and weak stiffness in a horizontal direction D2 perpendicular to the vertical direction D1. For this reason, a major axis of an oval shape of the centrifugal whirling of the rotary shaft 2 coincides with the horizontal direction D2.

The bearing casing 16 is an annular member configured to support the bearing pads 10 while covering the bearing pads 10 from the outer circumferential side.

The lubricant supply unit 17 brings the inside and the outside of the bearing casing 16 in communication with each other to supply a lubricant between the bearing pad 10 and the rotary shaft 2. In the embodiment, three of the lubricant supply units 17 are installed: one between the first bearing pad 11 and the second bearing pad 12, one between the first bearing pad 11 and the third bearing pad 13 and one between the second bearing pad 12 and the fourth bearing pad 14.

The casing 6 has a substantially cylindrical shape to support the bearing 5 from the outer circumferential side and covers the rotary shaft 2, the impeller 3 and the seal device 4 from the outer circumferential side. The casing 6 rotatably supports the rotary shaft 2 and the impeller 3 about the axis P with respect to the casing 6. A casing flow path 6*a*A is formed in the casing 6 to connect flow paths between the blades 3*c* in each of the impellers 3.

Further, an annular inlet port 6*b*A is formed in the casing 6 at a position outside in the radial direction of the end section of one side in the direction of the axis P. A connection flow path 6*c*A is formed between the inlet port 6*b*A and the flow path of the impeller 3 disposed at one side of three-stage impeller group 3A to connect the flow path of the impeller 3 to the inlet port 6*b*A. Accordingly, the process gas G can be introduced into the three-stage impeller group 3A from the outside.

In addition, a connection flow path 6*d*A connected to the flow path of the impeller 3 disposed at the other side of the three-stage impeller group 3A and extending outward in the radial direction is formed in the casing 6. Further, an annular discharge port 6*e*A connected to the connection flow path 6*d*A and disposed outside in the radial direction of the central position C in the direction of the axis P is formed in the casing 6.

Similarly, at the position to which the three-stage impeller group 3B is attached, a casing flow path 6*a*B, an inlet port 6*b*B, connection flow paths 6*c*B and 6 dB, and a discharge port 6B are formed in the casing 6. Accordingly, these are disposed at positions symmetrical to the casing flow path 6*a*A, the inlet port 6*b*A, the connection flow paths 6*c*A and 6*d*A, and a discharge port 6A in the axis P direction with respect to the central position C in the axis P direction.

Next, the seal device 4 will be described.

The seal device 4 is installed at the outer circumferential side of the rotary shaft 2 near the central position C between the three-stage impeller group 3A and the three-stage impeller group 3B, and seals circulation of the process gas G between the three-stage impeller group 3A and the three-stage impeller group 3B.

Here, the process gas G compressed in the three-stage impeller group 3A to arrive at the central position C of the rotary shaft 2 is introduced into the three-stage impeller group 3B to be further compressed, and then arrives at the vicinity of the central position C again (see a dotted line of FIG. 1). Accordingly, a pressure difference is generated between the three-stage impeller group 3A and the three-stage impeller group 3B at the central position C of the rotary shaft 2.

The seal device 4 is installed at the central position C to prevent the process gas G from circulating between the three-stage impeller group 3A and the three-stage impeller group 3B along the axis P by such a pressure difference.

Figure 3:
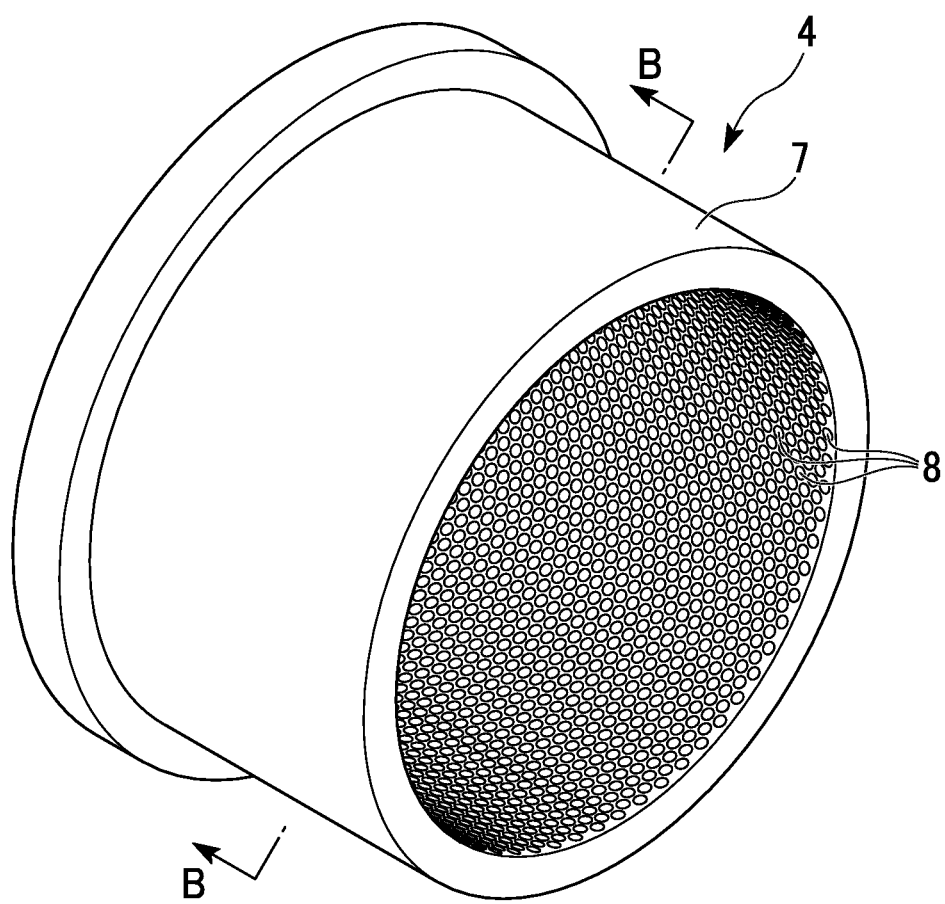
FIG. 3 is a general perspective view showing a seal device of the rotary machine according to the first embodiment of the present invention.

Then, as shown in FIG. 3, the seal device 4 includes a main body section 7 disposed at the outer circumferential surface of the rotary shaft 2 in the circumferential direction.

The main body section 7 is an annular member installed to have a gap between the outer circumferential surface of the rotary shaft 2 and the main body section 7. A plurality of holes 8 opened at the inner circumferential surface opposite to the outer circumferential surface of the rotary shaft 2 are formed in the main body section 7. That is, the seal device 4 is the hole pattern seal.

Figure 4:
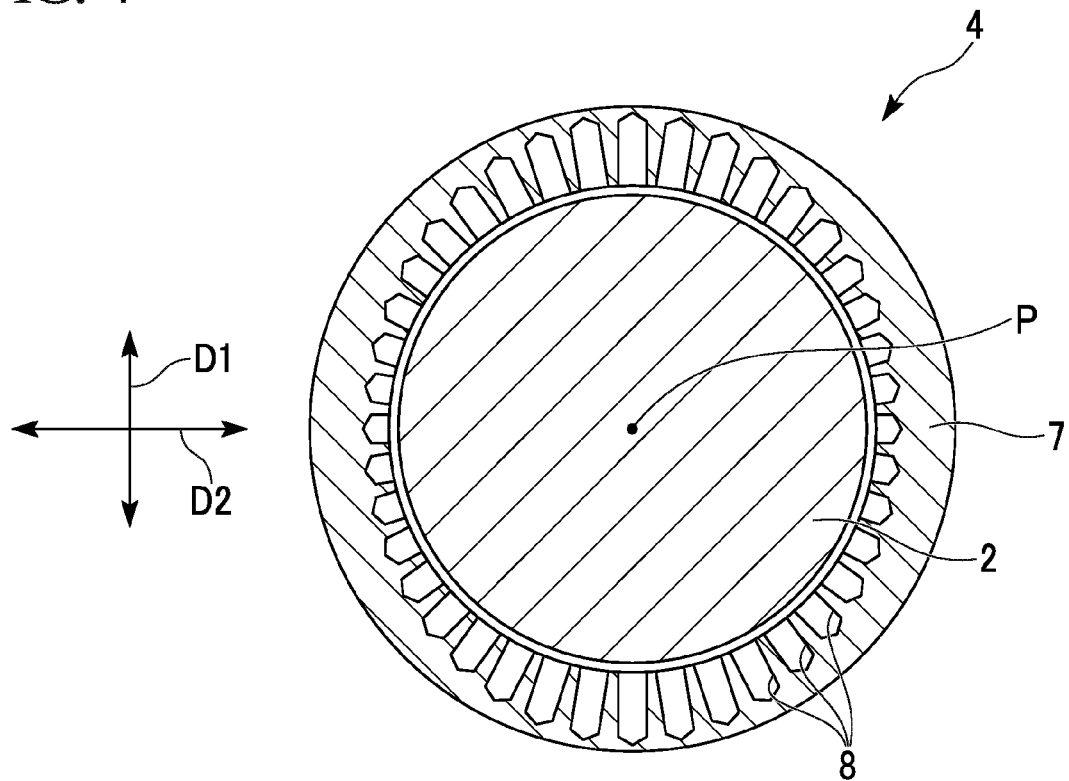
FIG. 4 is a cross-sectional view of the seal device of the rotary machine according to the first embodiment of the present invention, showing a cross-section taken along line B-B of FIG. 3.

As shown in FIG. 4, the plurality of holes 8 are concaved from the inner circumferential surface of the main body section 7 outward in the radial direction, and the holes 8 adjacent to each other in the circumferential direction have different depths (lengths in the radial direction). More specifically, in the embodiment, the depth is extremely increased at the hole 8 formed in the vertical direction D1, and the depth of the hole 8 is gradually reduced from the vertical direction D1 toward the horizontal direction D2. Then, the depth is extremely reduced at the hole 8 formed in the horizontal direction D2.

In the rotary machine 1, the depth of the hole 8 varies in the circumferential direction of the rotary shaft 2 in the seal device 4. For this reason, a natural frequency of an air core in the hole 8 varies in the circumferential direction.

Figure 5:
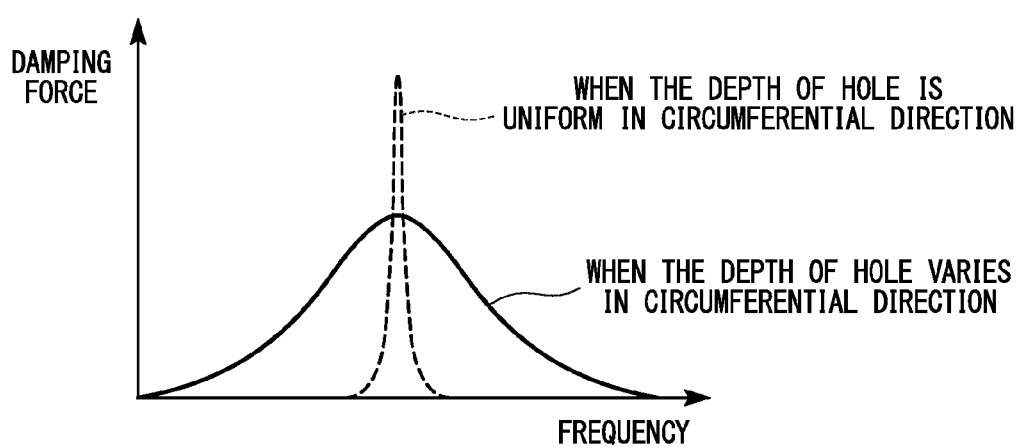
FIG. 5 is a graph showing a relation between a frequency of unstable vibrations generated in a rotary shaft and a damping force for attenuating the unstable vibrations of each frequency in the seal device of the rotary machine according to the first embodiment of the present invention.

Accordingly, as shown by a solid line of FIG. 5, the seal device 4 can apply a damping force of attenuating unstable vibrations of the rotary shaft 2 to unstable vibrations of various frequencies, and a sufficient vibration suppressing effect with respect to the rotary shaft 2 can be obtained. Meanwhile, as shown in a dotted line of FIG. 5, when the depth of the hole 8 is provisionally uniform in the circumferential direction, the damping force can be applied to only the vibrations of the frequency within an extremely small range. For this reason, it is difficult to expect a sufficient vibration suppressing effect with respect to the rotary shaft 2.

In addition, as the depth of the hole 8 in the seal device 4 varies in the circumferential direction, a ununiform pressure loss in the circumferential direction is generated from the process gas G introduced into each of the holes 8. Further, since the depth of the hole 8 varies in the circumferential direction, as a result, the thickness of the main body section 7 varies in the circumferential direction.

For this reason, the seal device 4 has different stiffness in the circumferential direction, i.e., anisotropic stiffness, and oval centrifugal whirling of the rotary shaft 2 generated by the anisotropic stiffness of the bearing 5 is not weakened. For this reason, as the centrifugal whirling is maintained, a seal effect can be obtained while suppressing unstable vibrations generated in the rotary shaft 2.

According to the rotary machine 1 of the embodiment, as the plurality of holes 8 of the seal device 4 have different depths in the circumferential direction, the unstable vibrations of the rotary shaft 2 can be suppressed, the seal effect can be obtained, and sealing of the process gas G becomes possible.

Further, in the embodiment, while the hole 8 is formed such that the depth varies in the circumferential direction in stages, at least two kinds of holes 8 having different depths are formed as the holes 8. Even in this case, since the two or more kinds of frequencies of unstable vibrations can be attenuated, this leads to improvement of an effect of suppressing the unstable vibrations. Accordingly, for example, the holes 8 having different depths may be randomly formed.

Further, the thickness in the radial direction of the main body section 7 may vary in the circumferential direction, and thus the seal device 4 provides the anisotropic stiffness in the circumferential direction more reliably, and an effect of suppressing the unstable vibrations can be improved.

[Second Embodiment]

Next, a rotary machine 21 according to a second embodiment of the present invention will be described.

Further, the same components as in the first embodiment will be designated by the same reference numerals, and a detailed description thereof will be omitted.

In the embodiment, a seal device 24 is different from that of the first embodiment.

The seal device 24 includes a main body section 27 having the same configuration as that of the first embodiment. The plurality of holes 8 open at the inner circumferential surface of the rotary shaft 2 are formed in the main body section 27.

Figure 6:
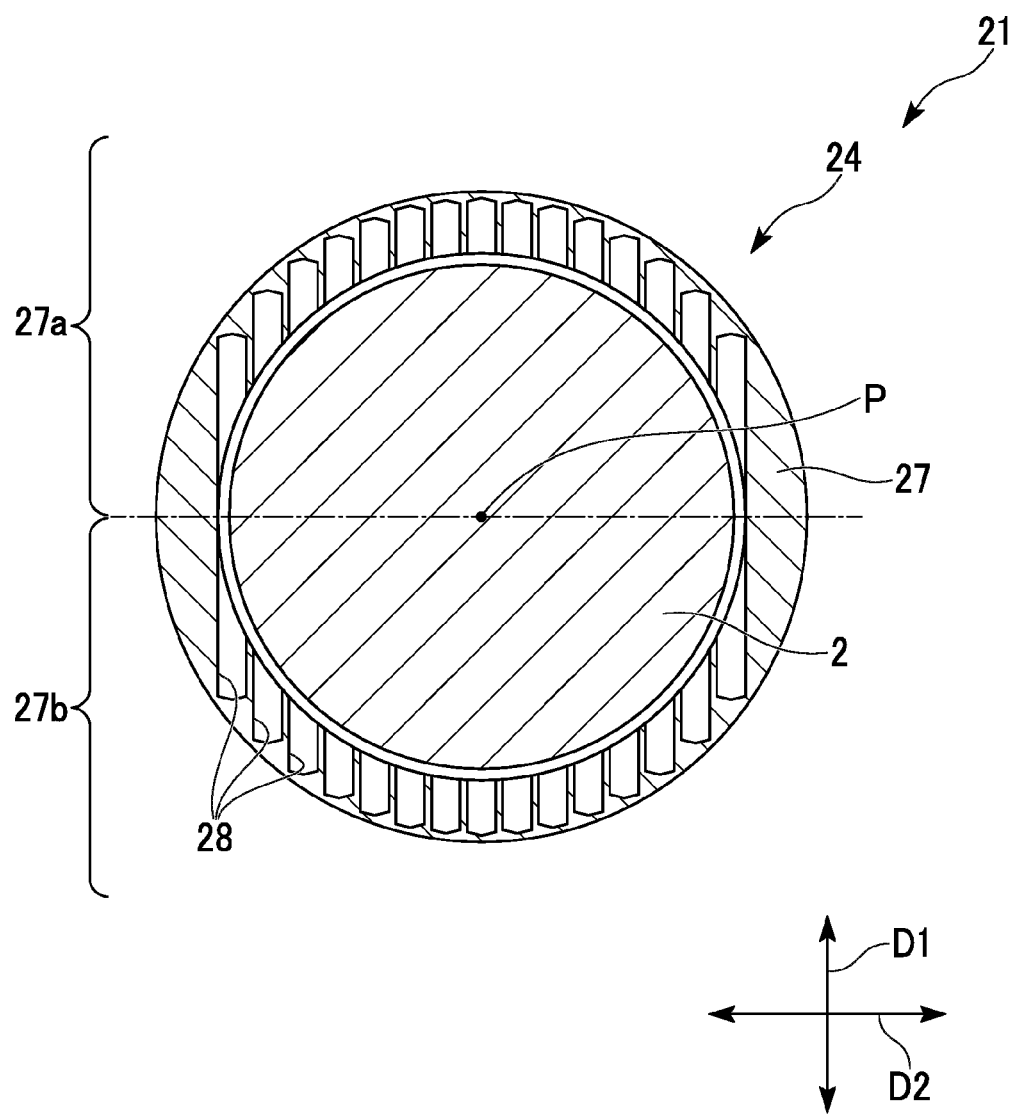
FIG. 6 is a cross-sectional view of a seal device of a rotary machine according to a second embodiment of the present invention, showing the same cross-sectional position as the cross-section taken along line B-B of FIG. 3.

As shown in FIG. 6, all of the plurality of holes 8 are formed in the vertical direction D1, which is an axial direction perpendicular to the axis P of the rotary shaft 2, to be concaved from the inner circumferential surface of the main body section 27 outward in the radial direction.

Further, the end sections outside in the radial direction serving as the terminations of the plurality of holes 8 are disposed at positions inside the outer circumferential surface of the main body section 7 in all of the holes 8, and positions in the radial direction in all of the holes 8 become the same positions. That is, distances from the axis P to the terminations in all of the holes 8 are substantially equal.

In the rotary machine 21, the holes 8 are formed such that the depths are different in the circumferential direction, and when the plurality of holes 8 are machined, the holes 8 can be formed toward one side. That is, since the holes 8 may not be machined while rotating the main body section 27 of the seal device 24, the holes 8 can be easily machined, unstable vibrations of the rotary shaft 2 can be suppressed, and a seal effect can be obtained.

Further, the main body section 27 of the seal device 24 of the embodiment may be divided into two sections, i.e., an upper half section 27a and a lower half section 27b. As such a divided structure is provided, a die cutting work becomes easy. For this reason, for example, the main body section 27, in which the holes 8 are previously formed, can be manufactured through casting or forging, and further, the machining can be facilitated. In addition, similarly, the main body section 7 of the seal device 4 of the first embodiment may be divided.

[Third Embodiment]

Next, a rotary machine 31 according to a third embodiment of the present invention will be described.

Further, the same components as in the first embodiment and the second embodiment will be designated by the same reference numerals, and a detailed description thereof will be omitted.

In this embodiment, a seal device 34 is different from those of the first embodiment and the second embodiment.

Figure 7:
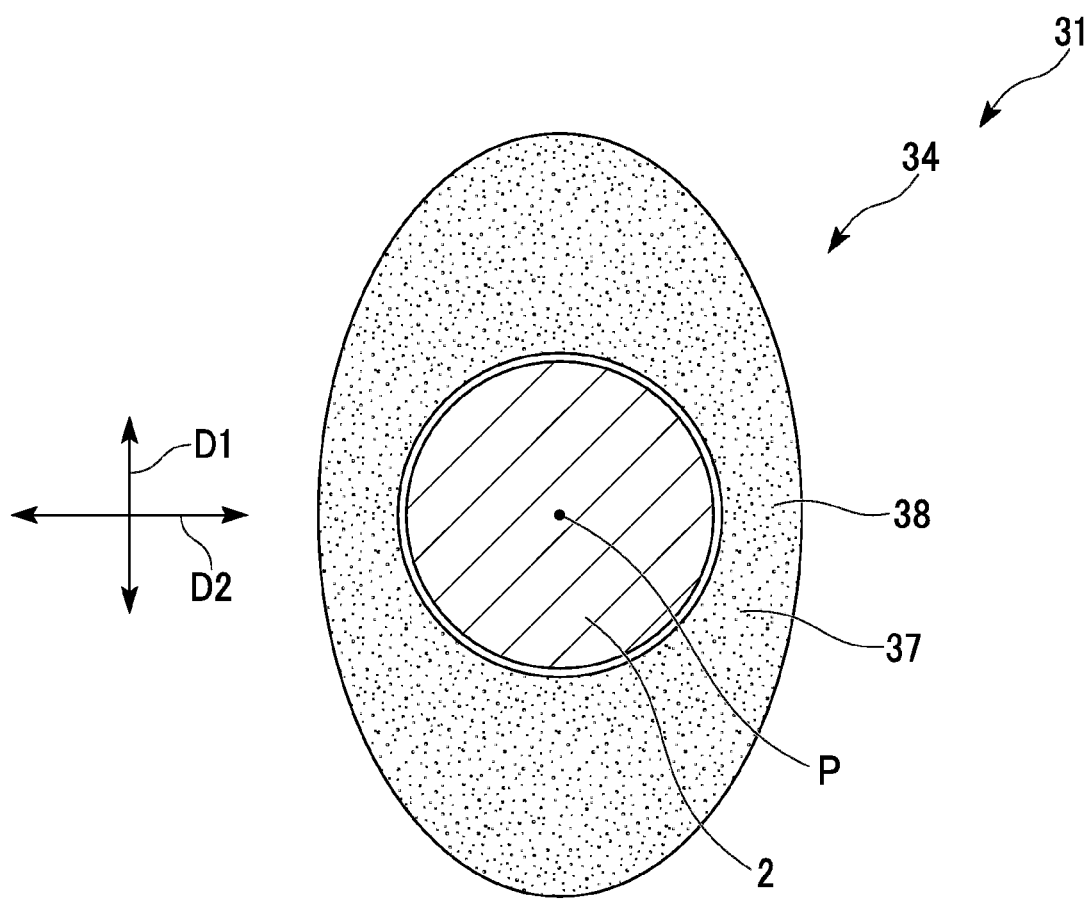
FIG. 7 is a cross-sectional view of a seal device of a rotary machine according to a third embodiment of the present invention, showing the same cross-sectional position as the cross-section taken along line B-B of FIG. 3.

As shown in FIG. 7, the seal device 34 includes a main body section 37 disposed at the outer circumferential surface of the rotary shaft 2 along the circumferential direction. The main body section 37 is a porous body in which the plurality of holes 8 are formed. For example, a material such as a foam metal formed of aluminum, foam ceramics, or the like, may be applied as the porous body.

In addition, the main body section 37 has an oval cross section, a major axis of which is in the vertical direction D1. That is, a thickness in the vertical direction D1 is increased and a thickness in the horizontal direction D2 is decreased such that a thickness in the circumferential direction varies.

In the rotary machine 31, as the main body section 37 of the seal device 34 is constituted by the porous body, the holes 8 are formed by bubbles of the porous body. For this reason, the holes 8 have random shapes in the circumferential direction.

Accordingly, similarly, the plurality of holes 8 having different diameters and depths are formed in the main body section 37, and accordingly, unstable vibrations of the rotary shaft 2 can be suppressed within a wide frequency range.

In addition, since the main body section 37 is formed of a porous body, there is no need to perform separate machining of the holes 8 with respect to the main body section 37. For this reason, cost can be reduced by decreasing the number of machining processes.

In addition, as the main body section 37 has an oval cross section, the seal device 34 has anisotropic stiffness in the circumferential direction. For this reason, the oval centrifugal whirling of the rotary shaft 2 is not weakened, and the seal effect can be obtained while suppressing unstable vibrations.

Further, the main body section 37 of the seal device 34 may not have the oval cross section, and for example, the thickness may not be uniform at least in the circumferential direction. As the main body section 37 has a non-uniform thickness in the circumferential direction, anisotropy in the stillness of the seal device 34 can be securely maintained, and unstable vibrations of the rotary shaft 2 can be suppressed.

In addition, even when the main body section 37 does not have an oval cross section, the stiffness may be varied in the circumferential direction in at least two radial directions that differ by 90 degrees. As the stiffness is different in two directions in this way, the seal device 34 has stiffness that reliably varies in the circumferential direction and can suppress the unstable vibrations of the rotary shaft 2.

Hereinabove, while the embodiments of the present invention have been described in detail, several design changes may be made without departing from the technical spirit of the present invention.

For example, in the seal device 4 (24, 34), a direction of the stiffness of the seal device 4 (24, 34), i.e., a disposition pattern of the holes 8 having different depths, should be determined according to a direction of a magnitude of the stiffness of the bearing 5 such that the oval centrifugal whirling of the bearing 5 does not become perfectly circular centrifugal whirling.

For this reason, for example, like the first embodiment, the plurality of holes 8 are not limited to being formed such that the depth of the holes 8 in the vertical direction D1 is maximally increased and the stiffness in the vertical direction D1 is maximally increased.

That is, while the number or disposition of the bearing pads 10 in the bearing 5 may vary, when the stiffness of the bearing 5 is different in the circumferential direction from the above-mentioned embodiment, the disposition pattern of the holes 8 having different depths of the seal device 4 should be determined according to the direction of the magnitude of the stiffness of the bearing 5.

In addition, while the holes 8 (28, 38) of the main body section 7 of the seal device 4 (24, 34) are formed to have different depths in the circumferential direction, the depths may be different even in the direction of the axis P. In the unstable vibrations of the rotary shaft 2, the vibrations twisting in the circumferential direction toward one side in the axis P direction may also be generated. For this reason, as the holes 8 (28, 38) are formed such that the depths are different even in the axis P direction, an effect of suppressing such twisted vibrations can also be obtained.

INDUSTRIAL APPLICABILITY

According to the above-mentioned seal device and rotary machine, as the plurality of holes opposite to the outer circumferential surface of the rotary shaft have different depths, the seal effect can be obtained while suppressing unstable vibrations of the rotary shaft.

REFERENCE SIGNS LIST 1 rotary machine
2 rotary shaft
3 impeller
3A, 3B three-stage impeller group
3a disk
3b cover
3c blade
4 seal device
5 bearing
6 casing
7 main body section
8 hole
10 bearing pad
11 first bearing pad
12 second bearing pad
13 third bearing pad
14 fourth bearing pad
15 filth bearing pad
16 bearing casing
17 lubricant supply unit
C central position
P axis
G process gas (fluid)
D1 vertical direction
D2 horizontal direction
21 rotary machine
24 seal device
27 main body section
28 hole
31 rotary machine
34 seal device
37 main body section
38 hole

The invention claimed is:

1. A seal device configured to prevent leakage of a fluid on an outer circumferential surface of a rotary shaft in a direction along an axis of the rotary shaft,
the seal device comprising an annular main body section disposed on the outer circumferential surface of the rotary shaft in the circumferential direction of the axis,
wherein a plurality of holes are formed in an inner circumferential surface of the main body section and are opening and facing to the outer circumferential surface of the rotary shaft, and
wherein the plurality of holes are separated from each other and include at least two kinds of holes having; different depths in the circumferential direction.

2. The seal device according to claim 1, wherein the main body section has different stiffness that varies in at least two radial directions of the axis that differ by 90 degrees.

3. The seal device according to claim 2, wherein the main body section is formed such that a depth of the hole in one of the two radial directions is larger than a depth of the hole in the other of the two radial directions.

4. The seal device according to claim 3, wherein the plurality of holes are formed in one direction perpendicular to the axis.

5. The seal device according to claim 4, wherein terminations of the plurality of holes are almost equally distant from the axis in the circumferential direction.

6. The seal device according to claim 5, wherein the main body section is formed to be divisible in one direction perpendicular to the axis.

7. The seal device according to claim 5, wherein the main body section has different thickness that varies in the circumferential direction.

8. The seal device according to claim 4, wherein the main body section is formed to be divisible in one direction perpendicular to the axis.

9. The seal device according to claim 4, wherein the main body section has different thickness that varies in the circumferential direction.

10. The seal device according to claim 3, wherein the main body section is formed to be divisible in one direction perpendicular to the axis.

11. The seal device according to claim 3, wherein the main body section has different thickness that varies in the circumferential direction.

12. The seal device according to claim 2, wherein the main body section is formed to be divisible in one direction perpendicular to the axis.

13. The seal device according to claim 2, wherein the main body section has different thickness that varies in the circumferential direction.

14. The seal device according to claim 1, wherein the main body section is formed to be divisible in one direction perpendicular to the axis.

15. The seal device according to claim 14, wherein the main body section has different thickness that varies in the circumferential direction.

16. The seal device according to claim 1, wherein the main body section is formed of a porous body, and pores of the porous body are the holes.

17. The seal device according to claim 16, wherein the main body section has different stiffness that varies in at least two of the radial directions of the axis by 90 degrees.

18. The seal device according to claim 16, wherein the main body section has different thickness that varies in the circumferential direction.

19. The seal device according to claim 1, wherein the main body section has different thickness that varies in the circumferential direction.

20. A rotary machine comprising:
a rotary shaft;
a pair of bearings configured to support the rotary shaft at both ends and having different stiffness that varies in a circumferential direction of the rotary shaft; and
the seal device according to claim 1 disposed between the pair of bearings.

* * * * *